Patented Aug. 29, 1944

2,356,822

UNITED STATES PATENT OFFICE 2,356,822

ELECTRIC ARC WELDING

John J. Chyle, Wauwatosa, Wis., assignor to A. O. Smith Corporation, Milwaukee, Wis., a corporation of New York No Drawing. Application September 24, 1942, Serial No. 459,518

5 Claims. (Cl. 219—10)

This invention relates to improvements in electric arc welding of the type employing a covered metallic welding electrode which is fused by the heat of the welding arc and deposits weld metal between the parts to be joined in a manner effecting interfusion of the deposited metal and the parts to provide an integral weld.

The invention arises out of certain difficulties in the welding of low allow high tensile strength steels of the general type of SAE 4340 (Society of Automotive Engineers standard classification). Alloys of this type have been used in the construction of air flasks for torpedoes and of armor plate for tanks and the like. The composition of SAE 4340 alloy is specified as follows:

|  | Per cent |
|---|---|
| Carbon | 0.35 to 0.45 |
| Manganese | 0.50 to 0.80 |
| Silicon | 0.15 to 0.30 |
| Chromium | 0.50 to 0.80 |
| Nickel | 1.50 to 2.00 |
| Molybdenum | 0.30 to 0.40 |
| Sulphur and phosphorus, preferably below 0.035 max. | |
| Balance iron | |

For some purposes, as in the making of air flasks, about 0.20% of vanadium is added to the composition to improve the grain structure and for other metallurgical reasons. This type of alloy has an attainable minimum tensile strength in the stress-relieved condition of about 120,000 pounds per square inch with a maximum of about 140,000 p. s. i. Several variations in alloy content outside of the range given above may be employed, the invention being applicable generally to the welding of steels having the high tensile strength referred to. In this respect, the invention is applicable to most of the armor plate compositions.

Heretofore, attempts to weld such high tensile strength steels have been unsatisfactory. In many instances, in order to provide the physical properties required in the fabricated structure it has been necessary to apply a heat-treatment to the parts prior to welding. The nature of the finished structure usually prevented the practical application of heat-treatment, involving heating, quenching and drawing, to the completed structure. This meant that the welding had to be done in such a manner as to provide an untreated welded joint of physical properties comparable to those of the treated parts.

The principal object of the present invention is to provide such a welded joint, having a minimum tensile strength of at least 120,000 p. s. i.

Another object is to provide such a weld that is capable of responding to heat-treatment.

Another object is to provide for the practical welding of high tensile strength alloys of the general type of SAE 4340.

Another object is to provide a weld suitable for the joining of armor plate and the like.

In carrying out the invention the welding is carried on under conditions which preserve the physical characteristics of the adjacent parts and a welding electrode is employed that supplies to the weld all of the corresponding ingredients of the parts in proportions that provide the required strength and properties.

One of the difficulties of welding this type of alloy is due to the relatively high carbon content. Arc welds do not normally contain 0.40% carbon. Attempts to employ regular hard surfacing rods containing high carbon were not satisfactory since they are not adaptable to welding in relatively deep grooves such as required for armor plate.

The present invention is based upon the discovery that the desired physical properties may be obtained in a weld having only from 0.10 to about 0.15% carbon, provided that other constituents, preferably the molybdenum, are increased.

Although an electrode having a core of the SAE 4340 composition may be employed, it has been found preferable to employ core wire of the SAE 4320 composition, since this has a lower carbon content and is more readily employed in deep grooves. The SAE 4320 composition is as follows:

|  | Per cent |
|---|---|
| Carbon | 0.15 to 0.25 |
| Manganese | 0.40 to 0.70 |
| Silicon | 0.15 to 0.30 |
| Chromium | 0.30 to 0.60 |
| Nickel | 1.65 to 2.00 |
| Molybdenum | 0.20 to 0.30 |
| Sulphur and phosphorus, preferably below 0.35 max. | |
| Balance iron | |

Again, vanadium may be added to improve the grain. The greater nickel content of SAE 4320 adds ductility to the weld.

With such a core for the electrode, the covering should contain a substantial addition of molybdenum and also preferably of vanadium, usually in the form of a ferro compound. A high manganese mineral type of covering has been found to be very satisfactory.

The exact quantity of molybdenum and vanadium added to the covering will vary from many factors and instead of stating them with reference to the covering, the amounts should be governed to provide the equivalent of a given amount in the alloy core of the electrode. With the rod of the SAE 4320 composition the covering should have a sufficient amount of molybdenum in it to be the equivalent of the addition of about 0.60% of molybdenum to the rod, making a total molybdenum content for the rod of over 0.80%. Likewise, with a rod of the SAE 4320 composition the covering may have a vanadium content equivalent to an addition of about 0.35% of vanadium to the rod. With core rods of different molybdenum and vanadium contents, the amounts added to the coverings should be adjusted to provide about the total amounts for each element specified above.

Analyses of satisfactory or typical weld deposits in plate stock of the SAE 4340 composition with about 0.20% of vanadium added, when employing an SAE 4320 rod covered as described, have ranged as follows:

| | Per cent |
|---|---|
| Carbon | 0.10 to 0.14 |
| Manganese | 0.50 to 0.59 |
| Silicon | 0.18 to 0.28 |
| Chromium | 0.33 to 0.56 |
| Nickel | 1.63 to 1.87 |
| Molybdenum | 0.77 to 0.88 |
| Vanadium | 0.12 to 0.14 |

Balance iron and impurities.

The molybdenum appears to take the place of carbon and provides a strong deposit without the difficulties encountered in employing a high carbon electrode in deep grooves. This advantage appears in the welding of parts having carbon in excess of about 0.30%. As a substitute for part of the molybdenum, it is possible to add to the chromium and nickel content of the electrode in the same manner.

A comparison of the above weld composition with the composition of the SAE 4340 alloy stock shows that the ingredients, with the exception of the carbon and molybdenum and the added vanadium are substantially the same in percentage.

In carrying out the welding operations it is advisable to preheat the plates to about 350° F. where possible, since this prevents too severe a quenching of the metal being deposited by the absorption of heat therefrom by the plate stock. The electrodes should not be too large and usually should be about 1/8 or 1/4 inch in diameter with welding currents of from 250 to 300 amperes. Such low heat values reduce the danger of possible modification in strength of the previously heat-treated plate stock adjacent the weld deposit.

Where it is possible to heat-treat the completed structure, the weld of the present invention is capable of responding to heat-treatment processes similar to the response of the plate stock, resulting in improvement or its physical properties.

The invention may have various embodiments within the scope of the accompanying claims.

I claim:

1. In the electric arc welding of low alloy high tensile strength steel containing in excess of about 0.30% carbon, and alloying ingredients of chromium, nickel and molybdenum, the improvement comprising employing a welding electrode of the same ingredients with lower carbon content and substantially higher molybdenum content than that of the work to provide a weld of tensile strength substantially equal to that of the stock.

2. In the electric arc welding of butt joints in thick parts of SAE 4340 steel, the improvement comprising employing an electrode core of SAE 4320 steel and adding thereto in a covering thereon the equivalent of about 0.60% of molybdenum to supply a higher molybdenum content for the welded joint and compensate for a lower carbon content in the weld.

3. In the electric arc welding of low alloy high tensile strength steel containing in excess of about 0.30% carbon, and alloying ingredients of chromium and nickel, the improvement comprising depositing and fusing with the work weld metal of the same ingredients with lower carbon content than that of the work and a substantial molybdenum content to provide a weld of tensile strength substantially equal to that of the stock being welded.

4. In the electric arc welding of heat-treated parts of low alloy high strength steel having a carbon content in excess of about 0.30% and having a tensile strength in excess of 120,000 pounds per square inch, the improvement comprising depositing a weld between the edges of the parts and fusing the same therewith having a substantially lower carbon content than that of the parts and containing sufficient molybdenum to provide a tensile strength for the weld deposit substantially equal to that of the parts, the remaining composition of the weld being substantially the same in ingredients and percentages thereof as that of the parts.

5. A welded joint between parts of heat-treated low alloy high strength steel containing molybdenum and having a carbon content in excess of about 0.30% and a tensile strength in excess of 120,000 pounds per square inch, said weld containing less carbon than said parts and a substantially greater amount of molybdenum and the like alloying elements compensating for such lower carbon, the composition of the weld being otherwise substantially the same in ingredients and amounts thereof as that of the parts.

JOHN J. CHYLE.